United States Patent [19]

Kenyon et al.

[11] Patent Number: 4,780,679

[45] Date of Patent: Oct. 25, 1988

[54] METHOD FOR DETERMINING LOW FREQUENCY CONDUCTIVITY OF SUBSURFACE FORMATIONS

[75] Inventors: William E. Kenyon; Paul L. Baker, both of Ridgefield, Conn.

[73] Assignee: Schlumberger Technology Corp., New York, N.Y.

[21] Appl. No.: 10,246

[22] Filed: Feb. 2, 1987

Related U.S. Application Data

[62] Division of Ser. No. 599,843, Apr. 13, 1984, Pat. No. 4,652,828.

[51] Int. Cl.$^4$ .......................... G01V 3/18; G01V 3/38
[52] U.S. Cl. .................................... 324/338; 324/341
[58] Field of Search ................ 324/338, 341; 73/152; 364/422

[56] References Cited

U.S. PATENT DOCUMENTS

| | | | |
|---|---|---|---|
| 3,760,260 | 9/1973 | Schuster | 324/338 |
| 3,944,910 | 3/1976 | Rau | 324/338 |
| 4,063,151 | 12/1977 | Suau et al. | 324/338 |
| 4,077,003 | 2/1978 | Rau | 324/338 |
| 4,151,457 | 4/1979 | Rau | 324/338 |
| 4,209,747 | 6/1980 | Huchital | 324/338 |

OTHER PUBLICATIONS

Warton et al., "Electromagnetic Propagation Logging", SPE Paper 9267, 1980, pp. 1-12.
Chew et al., "Dielectric Enhancement Due to Electrochemical Double Layer", J. Chem. Phys., vol. 77, No. 9, 11/1982, pp. 4683-4693.
Freedman et al., "An Automated Frequency Domain Technique", J. Phys. E. Sci. Inst., vol. 12, 1979, pp. 899-903.
Palaith et al., "Improved Accuracy for Dielectric Data", the Inst. on Phys., 1983, pp. 227-230.
Hanai, "Electrical Properties of Emulsions", Chapter 5 of Emulsion Science, Academic Press, 1968, pp. 354-478.
Hanai, "Theory of Dielectric Dispersion", 1960, Kollid-Zeitschrift, Band 171, Dept 1, pp. 23-30.

Primary Examiner—Reinhard J. Eisenzopf
Assistant Examiner—Walter E. Snow
Attorney, Agent, or Firm—Keith Smith; Peter Lee; Martin Novack

[57] ABSTRACT

Well logging techniques are set forth for obtaining improved measurements of formation dielectric permittivity, conductivity, and water-filled porosity. The effects of dielectric and conductivity frequency dispersion are considered and utilized. In a disclosed embodiment, an estimated low frequency conductivity of a formation surrounding a borehole is determined using the following steps: deriving a measured value of formation high frequency conductivity from a logging device which traversed the borehole; determining a formation conductivity dispersion ratio as a function of the measured conductivity; and determining an estimated low frequency conductivity from the measured value of high frequency conductivity and the dispersion ratio.

11 Claims, 9 Drawing Sheets

METHOD FOR DETERMINING LOW FREQUENCY CONDUCTIVITY OF SUBSURFACE FORMATIONS

This is a divisional of copending U.S. application Ser. No. 599,843 filed Apr. 13, 1984 now U.S. Pat. No. 4,652,828.

BACKGROUND OF THE INVENTION

This invention relates to well logging and, more particularly, to a method and apparatus for determining more accurately the dielectric permittivity, conductivity, and water-filled porosity of subsurface formations to obtain improved well logs.

It has long been recognized in the well logging art that a knowledge of the dielectric permittivity of a formation surrounding a borehole would provide useful information concerning the nature of fluids in the formation, since there is a striking contrast between the dielectric constant of water (about 80) and the dielectric constant of hydrocarbons (about 5). The development of electromagnetic propagation types of devices, such as the electromagnetic propagation tool ("EPT" device) described in U.S. Pat. No. 3,944,910, provided an improved technique for determining formation dielectric permittivity, as well as conductivity, using microwave electromagnetic energy at shallow depths of investigation.

Another device which measures formation dielectric permittivity and conductivity is known as a deep propagation tool ("DPT" device), an embodiment of which is described in U.S. Pat. No. 4,209,747. This device operates using radio frequency electromagnetic energy, and is capable of deeper investigation into the formations.

As described further hereinbelow, the measurements of dielectric permittivity and conductivity taken at practical measurement frequencies are found to include components which tend to make the measurements less useful. It is among the objects of the present invention to provide techniques for obtaining improved measurements of formation dielectric permittivity and conductivity, and to also obtain improved measurements of formation water-filled porosity.

SUMMARY OF THE INVENTION

The present invention makes use inter alia, of the fact that, at a given frequency, the dielectric permittivity dispersion and the conductivity dispersion can be determined as a function of the composite rock conductivity. There is a contribution to dispersion that is believed to be attributable to rock texture, and another contribution to dispersion which is believed to be due to clay content. In accordance with a form of the invention, a measured dielectric permittivity is corrected, by subtraction of dielectric dispersion factors to obtain a corrected dielectric permittivity. This corrected dielectric permittivity can be viewed as the "high frequency limit" dielectric permittivity; i.e. substantially the value of dielectric permittivity at the higher frequencies where the dielectric pemittivity vs. frequency dispersion curve levels off. Since dispersion varies for different types of rocks, for a given frequency and conductivity there will be a particular predetermined dispersion corrected that is implemented, for a given type of rock, in accordance with the invention.

In an embodiment of the invention, there is provided a method for determining a corrected dielectric permittivity of a formation surrounding a borehole. A measured value of formation dielectric permittivity is derived from a logging device which traversed the borehole. A measured value of formation conductivity is also derived from a logging device which traversed the borehole. A formation dielectric permittivity dispersion value is determined as a function of the measured conductivity; in particular, as a function of the logging device operating frequency divided by the measured conductivity. The corrected formation dielectric permittivity can then be obtained by subtracting the dispersion value from the measured value of dielectric permittivity. The corrected dielectric permittivity can, in turn, be utilized to obtain the water-filled porosity of the formation.

In an embodiment of the invention, a measured value of formation clay content is obtained, such as from a gamma ray logging device. A dielectric permittivity dispersion value, attributable to the clay, is determined and utilized in conjunction with the determined dielectric permittivity dispersion value that is attributable to rock texture.

In a further embodiment of the invention, an estimated low frequency conductivity of the formation is determined. In this technique, a measured value of formation high frequency conductivity is derived from a logging device which traversed the borehole. A formation conductivity dispersion ratio is determined as a function of the measured conductivity. The estimated low frequency conductivity is then determined from the measured value of high frequency conductivity and the conductivity dispersion ratio.

Further features and advantages of the invention will become more readily apparent from the following detailed description when taken in conjunction with the accompanying drawings.

DESCRIPTION OF THE PREFERRED EMBODIMENT

Figure 1:
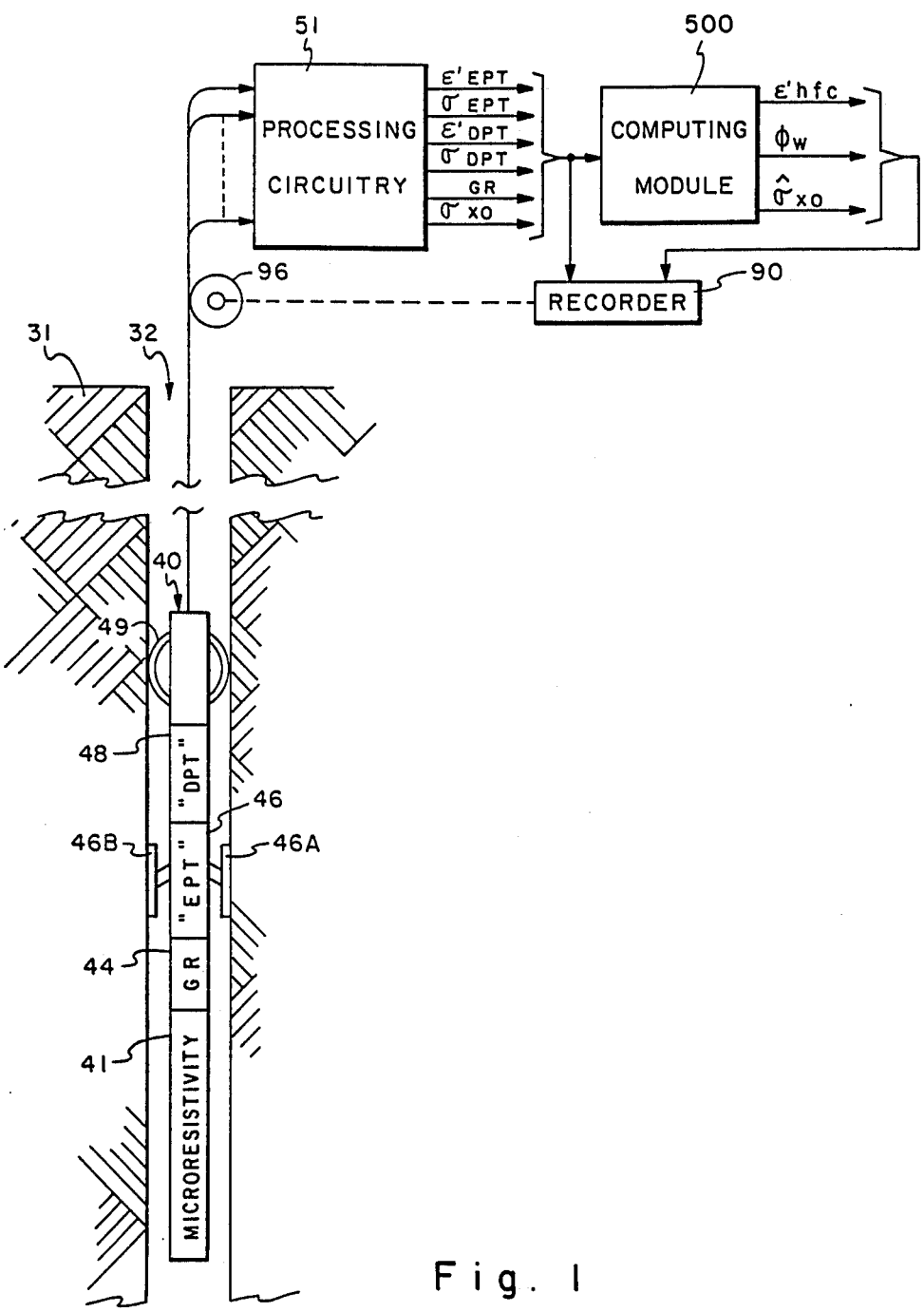
FIG. 1 is a block diagram, partially in schematic form, of an apparatus in accordance with an embodiment of the invention and which can be used to practice an embodiment of the method of the invention.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 40 is suspended in the borehole 32 on an armored cable 33, the length of which substantially determines the depth of the device 40. The cable length is controlled by suitable means at the surface such as a drum and winch mechanism (not shown). Circuitry 51, shown at the surface, although portions thereof may typically be downhole, represents processing circuitry for the various logging units of apparatus 40.

The investigating apparatus 40 includes an electromagnetic propagation tool ("EPT" device) 46 which has a pad member 46A with transmitting and receiving antennas therein. Microwave electromagnetic energy is transmitted through the formations (typically the invaded zone) and formation characteristics are determined by measuring the travel time and attenuation of received energy This type of logging tool is described in U.S. Pat. No. 3,944,910. Measurements indicative of attenuation, designated ATT, and of travel time (which determines phase) designated $t_{pl}$, are available from this tool. The manner in which these measurements can be used to derive formation parameters is described, for example, in "Electromagnetic Propagation Logging: Advances In Technique And Interpretation", by R. Wharton et al., SPE 9267. The dielectric permittivity and conductivity of the formation (generally the invaded zone) as determined from the EPT device and designated $\epsilon'_{EPT}$ and $\sigma_{EPT}$, respectively, can be obtained from $$\epsilon_{EPT}' = .3 t_{pl}^2 - \left(\frac{ATT}{200}\right)^2$$

$$\sigma_{EPT} = .003\, t_{pl} \cdot ATT$$

The processing circuitry for developing these logged values is contained within the processing circuitry 51, and $\epsilon'_{EPT}$ and $\sigma_{EPT}$ are indicated as outputs thereof.

The investigating apparatus also includes a device 48 which employs radio frequency electromagnetic energy in the frequency range between about 10 MHz and 100 MHz (and typically, about 25 MHz), to determine the dielectric permittivity and conductivity of formations through which the electromagnetic energy has passed. A device of this type is the deep propagation tool ("DPT" device), an embodiment of which is described in U.S. Pat. No. 4,209,747. This device includes a transmitting antenna, a "close" differential receiver antenna pair, and a "far" differential receiver antenna pair. Each of the transmitter and receiver antennas are coils wound in insulating media mounted on a cylindrical pipe. Briefly, operation of the DPT logging device involves energizing the transmitter to emit electromagnetic energy which travels through the formations and is received at the close and far receiver pairs. The signals detected at the far receiver pair are used to determine the phase shift of electromagnetic energy that has passed through the formations, and the signals detected at the close receiver pair are used to determine relative attenuation of the electromagnetic energy. As described in the above referenced U.S. Pat. No. 4,209,747, the phase shift and attenuation are then employed to obtain electrical permittivity and electrical conductivity of the formations, respectively designated $\epsilon'_{DPT}$ and $\sigma_{DPT}$. The processing circuitry for developing these logged values is contained within the processing circuitry 51, and $\epsilon'_{DPT}$ and $\sigma_{DPT}$ are indicated as outputs thereof.

The investigating apparatus includes a further device 44 which is a gamma ray logging device for measuring the natural radioactivity of the formations. The device 44, as known in the art, may typically include a detector, for example a gamma ray counter, which measures the gamma radiation originating in the formations adjacent the detector. An output of circuitry 51 is a signal designated "GR" which represents the gamma ray log rading, and is indicative of the clay content of the formations.

A shallow investigation low frequency resistivity measuring device 41 for example a microresistivity device of the type described in U.S. Pat. No. 3,760,260, is also provided in the present embodiment, and conventionally produces an invaded zone conductivity which is indicated as output $\sigma_{xo}$ of processing circuitry 51.

To keep the investigating apparatus 40 centered in the borehole, an extendable wall-engaging membe 46B may be provided opposite the member 46A. For centering the upper portion of the investigating apparatus, centralizers 49 may also be provided. It will be understood that various alternative means can be provided for arranging, configuring, and mounting the devices shown, or similar devices.

The signal outputs of block 51 are illustrated in FIG. 1 as being available to computing module 500 which, in the present embodiment, is implemented by a general purpose digital computer, such as a model PDP-11 sold by Digital Equipment Corp. It will be understood, however, that a suitable special purpose digital or analog computer could alternatively be employed. The outputs of the computing module 500, illustrated in FIG. 1, are signal values developed in accordance with techniques described hereinbelow. These signals are recorded as a function of depth on recorder 90, which generically represents graphical, electrical and other conventional storage techniques. Other signals, as obtained herein, can also be recorded.

While all of the measurements to be used in practising the invention are shown, for ease of explanation in the illustrative embodiments, as being derived from a single exploring device, it will be understood that these measurements could typically be derived from a plurality of exploring devices which are passed through the borehole at different times. In such case, the data from each run can be stored, such as on magnetic storage media, for subsequent processing consistent with the principes of the invention. Also, the data may be derived from a remote location, such as by transmission therefrom.

Before further describing operation of the embodiments hereof, certain experimental data and underlying theory which relate to the invention will be set forth:

Platey non-conducting grains cause the dielectric constant of composite rock to increase at lower frequencies. This is called dielectric dispersion. It is believed to occur because the platey grains act as capacitors with a small spacing in one dimension and, therefore, have a large capacitance. Another way of looking at it is that under an electric field applied across the platey grain, opposite charges on opposite sides of the plate will attract each other strongly due to electrostatic forces, while the length of the path around the edges of the plate prevent these charges from neutralizing each other by flow through the surrounding conductive medium. The presence of the opposite charges constitutes an electric polarization, equivalent to a relatively high dielectric constant.

As in a resistor-capacitor circuit, when the external field is removed, the charges will dissipate, in this case with a relaxation time proportional to the dielectric constant of the platey particles, divided by the conductivity of the conducting medium. If one makes an alternating current measurement at low frequency, one measures a relatively high dielectric constant due to the charge polarization at the platey grains; if one measures at high frequency, one measures a relatively low dielectric constant, as there is insufficient time for the charges to polarize. Therefore, the dielectric constant varies with frequency, increasing at low frequency. Applicant has demonstrated that as conductivity of the water is increased, the dispersion curve will move up in frequency in proportion to it. This phenomenon, inter alia, is used in the present invention.

The dielectric permittivity and conductivity measurements described hereinbelow were made, at room temperature, by measuring the reflection and transmission characteristics of the sample in a sample cell using a network analyzer (see M. S. Freedman et al., J. Phys. E:Sci. Inst. 12,899, (1979)). The sample cell consisted of a section of coaxial waveguide in which the rock sample constituted the dielectric medium between inner and outer conductors of the waveguide. Teflon plugs at each end of the sample were used as seals to contain the water content in the sample. The dielectric constant and conductivity of the sample were computed using both forward and reverse scattering parameters. (See, for example, Palaith & Chang, "Improved Accuracy For Dielectric Data", The Institute For Physics, 1983.)

Figure 2:
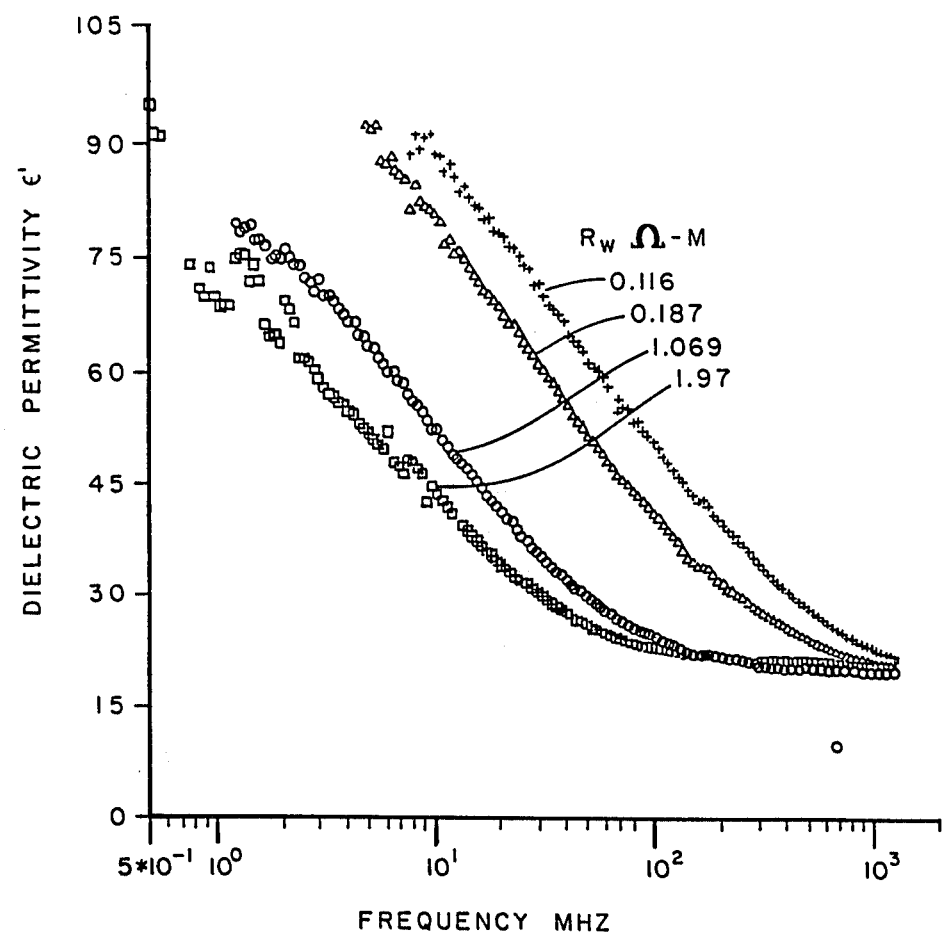
FIG. 2 shows the measured dielectric permittivity vs. frequency of a carbonate rock as water resistivity is changed over a range of values.
Figure 3:
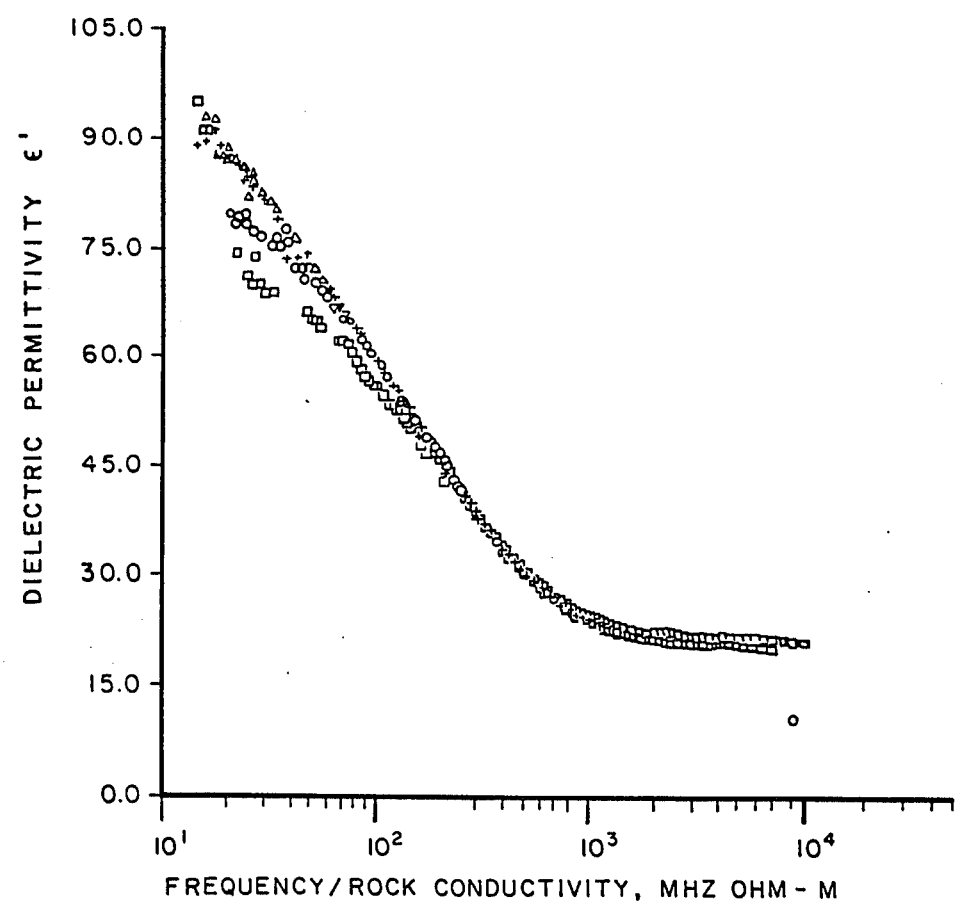
FIG. 3 shows the FIG. 2 curves plotted as a function of frequency divided by rock conductivity.

FIG. 2 shows the measured dielectric permittivity vs. frequency of a carbonate rock as water resistivity is changed over the range values indicated in the FIGURE. In FIG. 3 the same data is shown, but with the dielectric permittivity plotted as a function of frequency divided by rock conductivity. The curves for different water resistivities coincide or "stack". Applicants have observed this stacking in various lab measurements in clay-free rocks over a broad range of salinities, as well as in clay-bearing rocks at moderate and high salinities where the effects of rock texture evidently swamps out the effect of charge on the clays. The stacking of dispersion curves as a function of frequency divided by rock conductivity is significant in that it means that, at a given frequency, the dielectric dispersion is a function of composite rock conductivity. After obtaining the dielectric dispersion factor it is subtracted from the measured dielectric constant to obtain the "high frequency limit" dielectric constant. Since dispersion varies for different types of rock, for a given frequency and conductivity there will be a particular predetermined dispersion correction that is implemented, for a given type of rock, in accordance with the invention.

Figure 4:
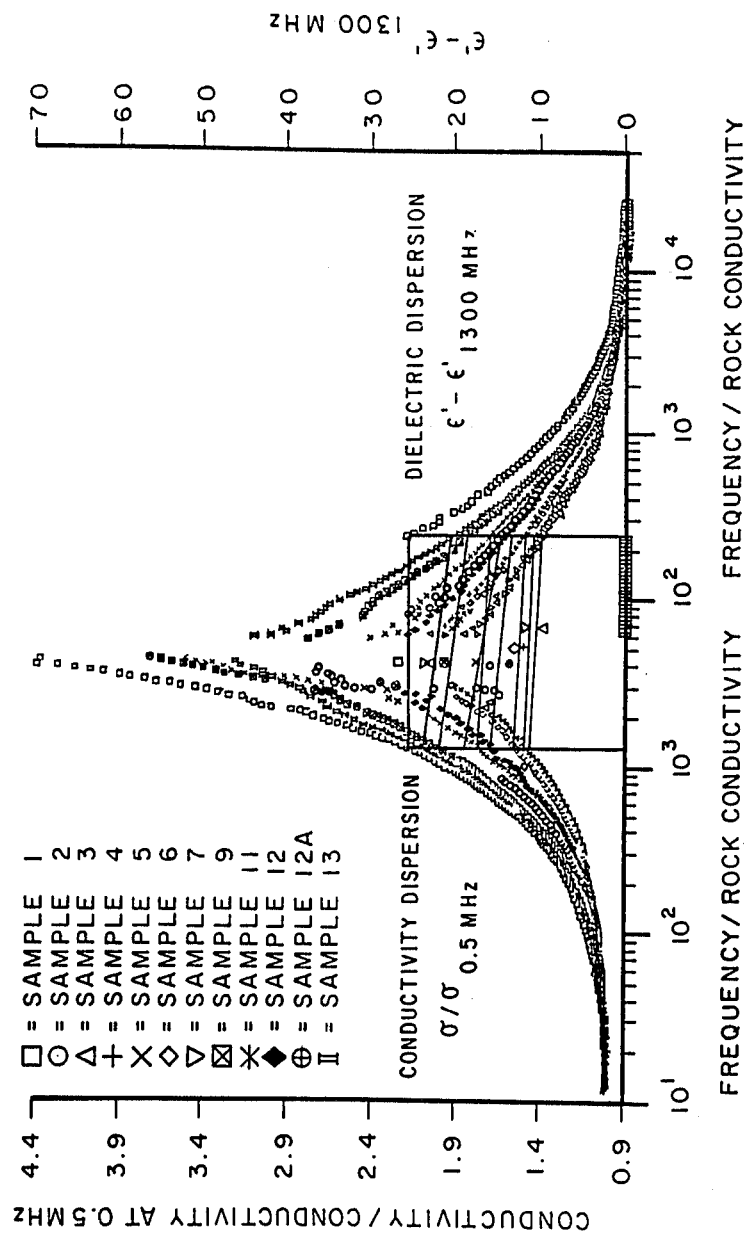
FIG. 4 illustrates dielectric permittivity dispersion and conductivity dispersion for different samples of carbonate block.

FIG. 4 shows, on the right, the dielectric dispersion $\epsilon' - \epsilon'_{1300\ MHz}$ (where $\epsilon'_{1300\ MHz}$ approximates the high frequency limit of $\epsilon'$) for different samples from another carbonate formation. The shapes of the dielectric dispersion curves are quite similar to each other. The left side of the FIGURE shows conductivity dispersion $\sigma/\sigma_{0.5\ MHz}$ (where $\sigma_{0.5}$ MHz represents a stable low frequency value) curves for the same samples, which also have shapes similar to each other. There is seen to be a relationship between dielectric permittivity dispersion and conductivity dispersion; the samples with high dielectric dispersion also having high conductivity dispersion. The straight lines in the center of the FIGURE connect corresponding sample values of dielectric and conductivity dispersion.

Figure 5:
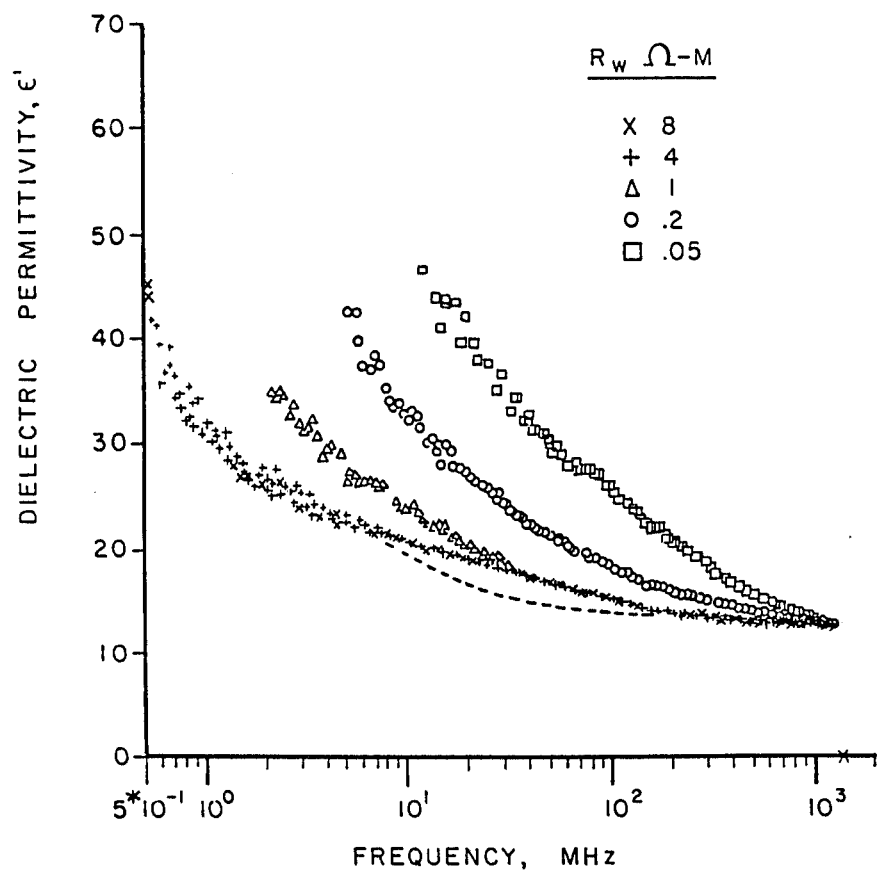
FIG. 5 is a graph of dielectric permittivity vs. frequency for a sandstone sample for different water resistivties.

FIG. 5 shows measured dielectric permittivity versus frequency for a sandstone sample with five different water resistivities. These curves stack poorly as compared to the carbonates. The lower salinity (high resistivity) curves for 8 and 4 ohm-meter water, can be seen to have a gradual increase in dielectric permittivity (as compared to the expected shape—shown in dashed line) between about 1000 MHz and 10 MHz. The sandstone behavior suggests that two relaxation mechanisms are contributing to dispersion; the rock texture (e.g. platey grains, as described above), and a clay effect (e.g. the relaxation of the double layer around charged clay grains—see Sen, P., Chew, W. "Dielectric Enhancement Due to Electrochemical Double Layer: Thin Double Layer Approximation", J. Chem. Phys. 77 (9), November, 1982). To test this possibility, the slope of the dielectric permittivity curve (between 10 and 100 MHz) was plotted against cation exchange capacity ("CEC"), which depends on the volume of clay, and there was found to be a good correlation between the slope of $\epsilon'$ and the clay volume. The clay effect on dispersion, e.g. for the FIG. 5 curves, can be determined by plotting $\epsilon'$ against frequency divided by rock conductivity. The previously mentioned sloped line in the higher water resistivity curves will lie above the stacked lower water resistivity curves by an amount which approximates the clay contribution to dielectric dispersion.

Figure 6:
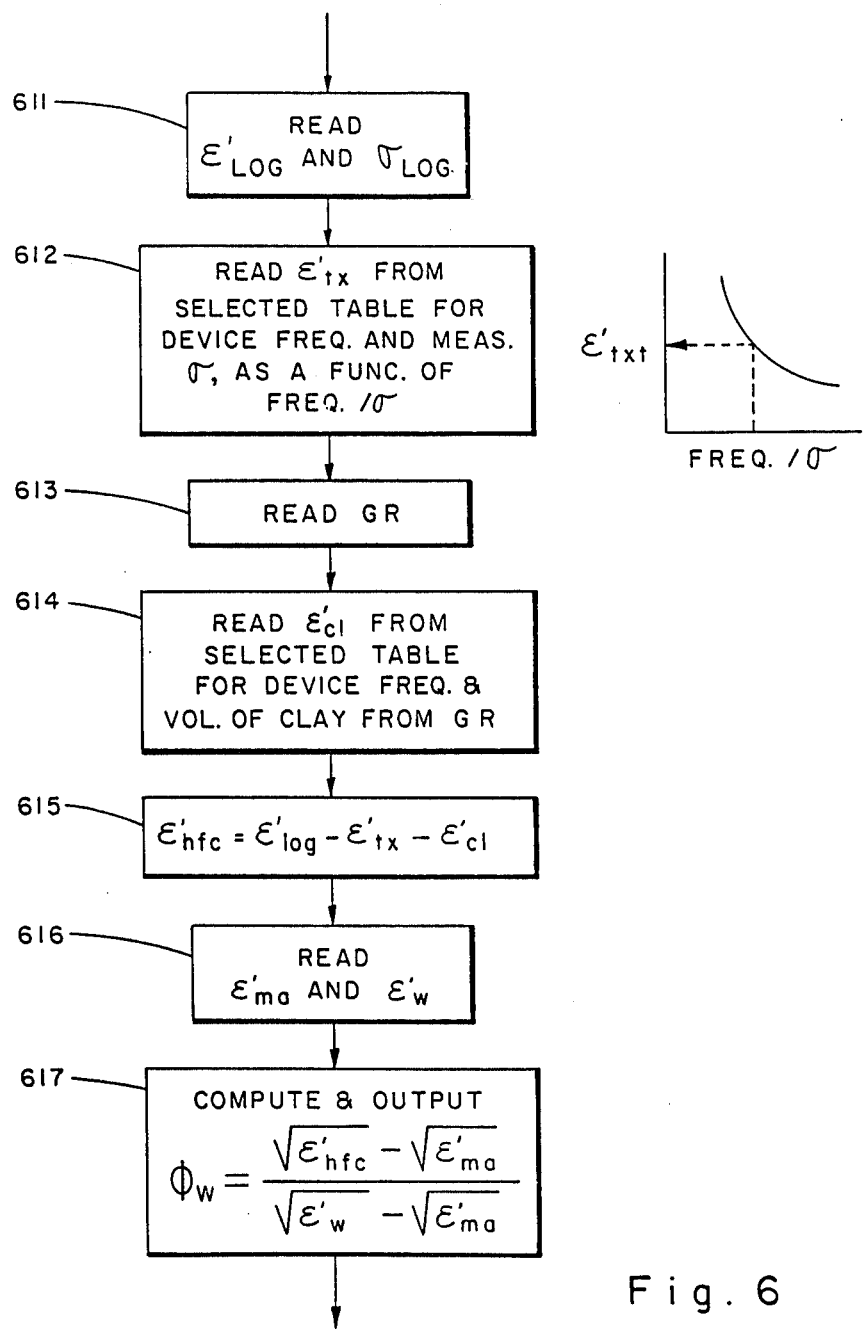
FIG. 6 is a flow diagram of a routine for programming the processor of FIG. 1 to obtain corrected dielectric permittivity and water-filled porosity of a formation in accordance with a form of the invention.

Referring to FIG. 6, there is shown a flow diagram of a routine for programming the processor 500 to obtain corrected dielectric permittivity and water-filled porosity of the formation in accordance with a form of the invention. The block 611 represents the reading of the logged values of $\epsilon'$ and $\sigma$, respectively designated $\epsilon'_{log}$ and $\sigma_{log}$, from the processing circuitry 51. In the exemplary embodiments hereof, the logged values can be $\epsilon'_{EPT}$ and $\sigma_{EPT}$ or $\epsilon'_{DPT}$ and $\sigma_{DPT}$, or, processing can be implemented in parallel for the logged values from both logging devices. The block 612 is then entered, this block representing the reading of a value of $\epsilon'_{tx}$; i.e. a dielectric permittivity dispersion value attributable to rock texture, from a selected dielectric permittivity dispersion function table. $\epsilon'_{tx}$ is selected as a function of the logging device frequency and the logged value of conductivity, $\sigma_{log}$, as represented by the sketch to the right of the block 612. The curve in the sketch represents the dielectric permittivity dispersion curve, which is obtained, in tabular form in the present embodiment, using the routine described in conjunction with FIG. 7. The block 613 represents the reading of the input from the gamma ray logging device 44, and the block 614 represents the reading of $\epsilon'_{cl}$ from a table which stores a function of the clay contribution to dielectric dispersion, at the particular device frequency, and as a function of the measured clay volume. The manner in which this table is stored is described in conjunction with FIG. 8. In the context of the present embodiments, the correction for the contribution of the clay volume to dielectric permittivity dispersion will be small at the relatively higher frequency of operation of the EPT logging device 46, but may be significant, depending upon clay content, at the relatively lower frequency of the DPT logging device 48. Accordingly, the inclusion of a factor $\epsilon'_c$ is considered optional. The block 615 is then entered, this block representing the computing and ouputting of the corrected dielectric permittivity, $\epsilon'_{hfc}$, which in this case is a corrected high frequency limit dielectric permittivity as obtained by subtracting the dielectric dispersion contributions from the measured value of dielectric permittivity, in accordance with the relationship:

$$\epsilon'_{hfc} = \epsilon'_{log} - \epsilon'_{th} - \epsilon'_{cl}$$

Having obtained a corrected dielectric permittivity, known parameters concerning the dielectric permittivity of matrix material and the water are read in, as represented by the block 616. The mixing law relationship (see, for example, the above-referenced U.S. Pat. No. 3,994,910) can then be used to compute and output the water-filled porosity, $\phi_w$, in accordance with:

$$\phi_w = \frac{\sqrt{\epsilon_{kfc}'} - \sqrt{\epsilon_{ma}'}}{\sqrt{\epsilon_w'} - \sqrt{\epsilon_{ma}'}}$$

represented by the block 617. If desired, suitable correction can be implemented, in obtaining the corrected value of permittivity, by also taking into account the effect on the water dielectric permittivity which occurs at high salinities. Generally, the DPT device is adapted for use at lower salinities which reduces the need for such further correction in conjunction with the DPT device.

Figure 7:
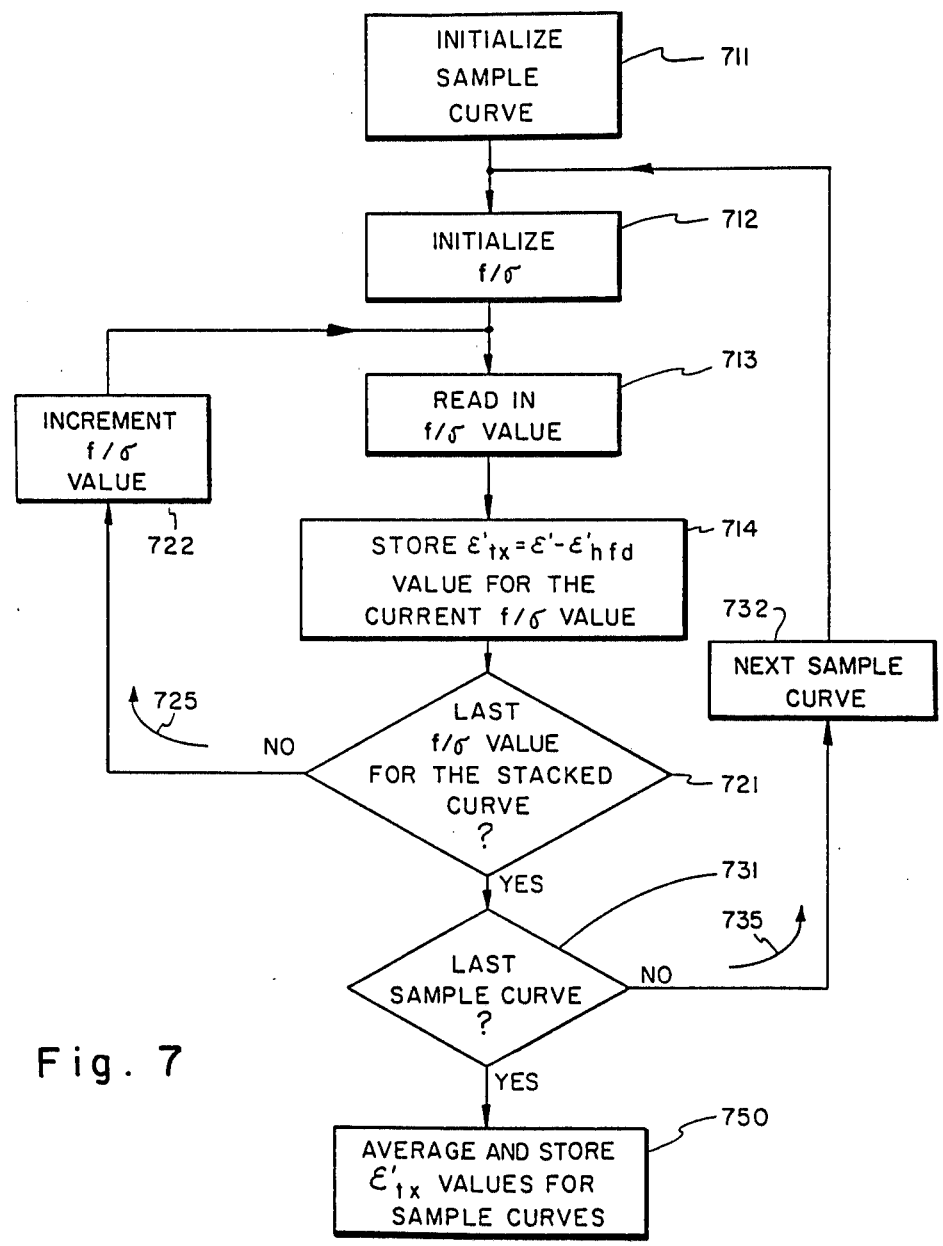
FIG. 7 is a flow diagram of the routine for obtaining look-up tables representative of dielectric permittivity dispersion values attributable to rock texture.

Referring to FIG. 7, there is shown a routine for storing a table or tables representative of a dielectric permittivity dispersion function or functions, such as were used in conjunction with the block 612 of the FIG. 6 routine. In the present example, the data in the stacked curves of FIG. 3 provided the source for the function or functions stored in the table. The first block, 711, represents the initialization to the first stacked curve to be entered in the table, e.g., the curve corresponding to a water resistivit $R_w$, of 0.116 ohm-meters (see also FIG. 2). The value of frequency over rock conductivity is initialized (block 712) and read in (block 713). A value of the textural contribution of dielectric permittivity, $\epsilon'_{tx}$, is then obtained by taking the dielectric permittivity $\epsilon'$ from the data and subtracting the high frequency limit for the data, $\epsilon_{hfd}$, this value being represented in FIG. 3 by the dashed horizontal line. It will be understood that this carbonate formation does not have any substantial clay effect, so the observed dispersion is attributable to textural dispersion. The value of frequency divided by conductivity is then tested (diamond 721) to determine if the last value of frequency divided by conductivity has been reached. If not, the value of frequency divided by conductivity is incremented (block 722), and the loop 725 is continued as all the values of $\epsilon'_{tx}$ are entered in the table associated with the first curve. At completion, inquiry is made as to whether or not further sample curves are to be processed into tables and, if so, the next sample curve is input (block 732) and treated in the same way, in accordance with the larger loop 735. If desired, the curves can then be averaged and stored as a single table, as represented by the block 750.

Figure 8:
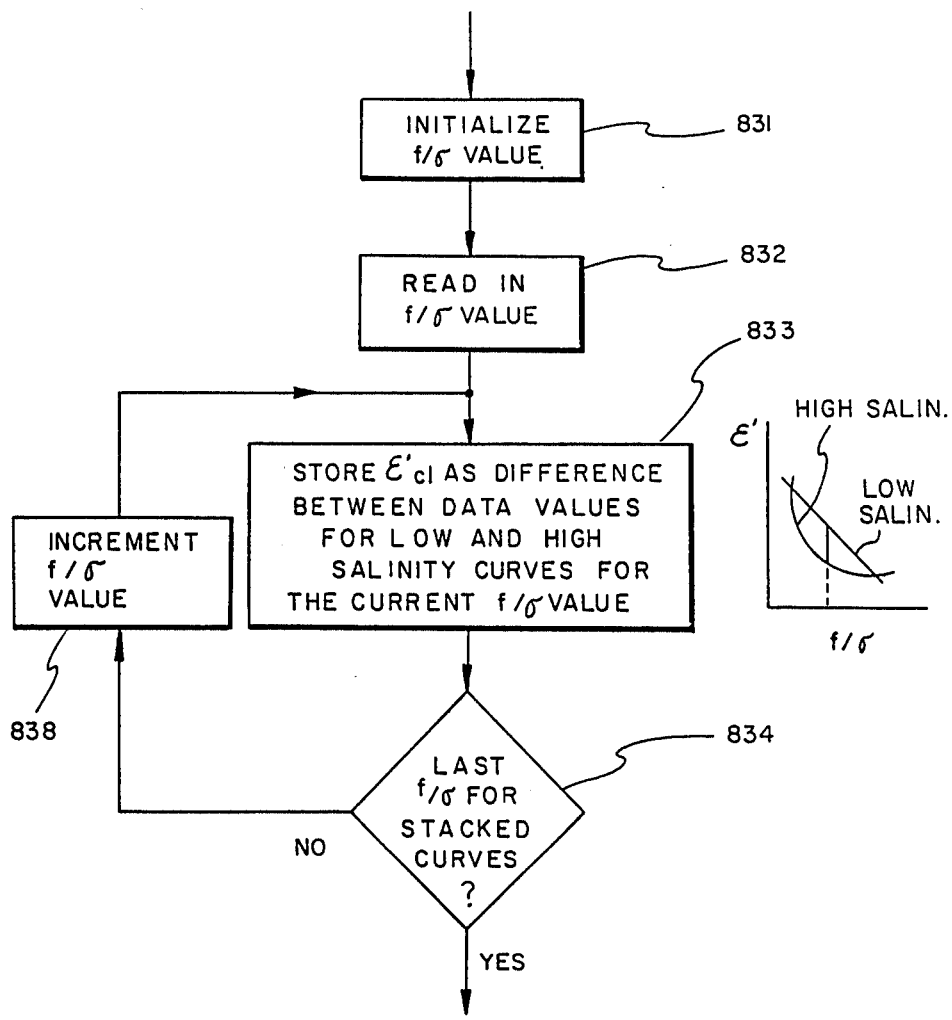
FIG. 8 is a flow diagram of the routine for storing look-up tables representative of the contribution of clay volume to dielectric permittivity dispersion.

Referring to FIG. 8, there is shown a flow diagram of the routine for storing a table for the function of the clay contribution to dielectric dispersion as it varies with frequency divided by conductivity. The sandstone samples of FIG. 5, which, as previously described, exhibit a substantial clay dispersion effect in the lower salinity (higher resistivity) rock samples, will be used in this example to obtain $\epsilon'_{cl}$. The blocks 831 and 832 respectively represent the initialization and reading in of frequency divided by conductivity values. $\epsilon'_{cl}$ is then determined and stored as a difference between data values for low salinity and high salinity stacked dispersion curves, as taken at the current $f/\sigma$ value. The sketch to the right of block 833 illustrates the computation. A determination is then made (diamond 834) as to whether or not the last value of $f/\sigma$ has been treated. If not, the $f/\sigma$ value is incremented (block 838), and the loop 835 continues until completion. As described above, it will be understood that averaging of data can be utilized to obtain average tables representative of data in multiple curves, or, a collection of tables can be stored and selected for use, as required.

Figure 9:
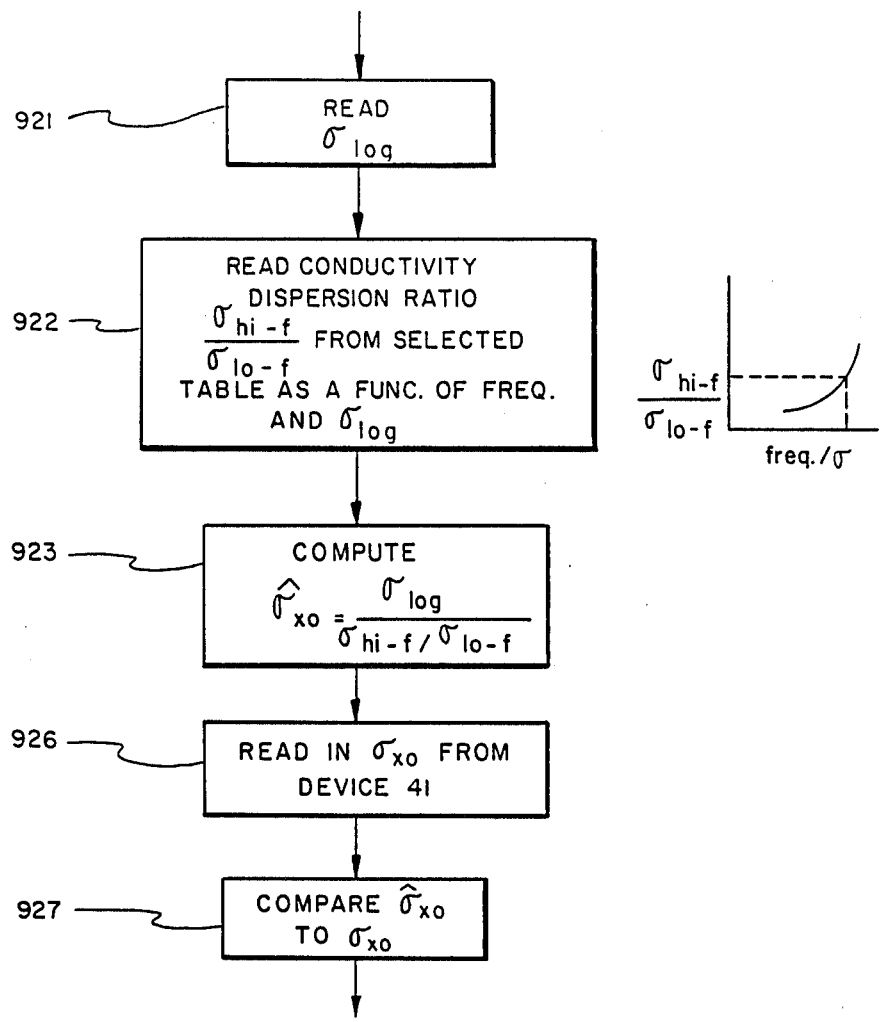
FIG. 9 is a flow diagram of a routine which utilizes a conductivity dispersion function to estimate low frequency conductivity and compare it against a measured low frequency conductivity.

Referring to FIG. 9, there is shown a flow diagram of a routine for utilizing conductivity dispersion to obtain a conductivity dispersion function which is used, in turn, to obtain an estimate of low frequency conductivity (in this example, for the invaded zone, and designated $\hat{\sigma}_{xo}$) which can, if desired, be compared against a measured value of low frequency conductivity (again, in this example, for the invaded zone, and designated $\sigma_{xo}$). In the present example, the carbonate sample conductivity data of FIG. 4 can be utilized. The block 921 represents the reading of the measured conductivity value, $\sigma_{log}$, which, in this example, is the conductivity as measured by the EPT logging device 46, $\sigma_{EPT}$. The block 922 is then entered, this block representing the reading of a conductivity dispersion ratio, $\sigma_{hi-f}/\sigma_{lo-f}$ from a table representative of a conductivity dispersion ratio function, as obtained in this example from the data of FIG. 4. Again, the table value is selected as a function of the device frequency divided by the measured conductivity. As in the previous embodiments, the table representative of the desired function can be obtained using a routine which steps through values of frequency divided by rock conductivity. In this case, the source of the data points is the conductivity dispersion ratio (e.g., FIG. 4), which uses the conductivity at 0.5 MHz as the $\sigma_{lo-f}$ denominator. The sketch to the right of block 922 illustrates the manner in which the conductivity dispersion ratio value is obtained from the table. The block 923 represents the computation of the estimated value of low frequency conductivity as being the ratio of the measured high frequency conductivity divided by the just-determined conductivity dispersion ratio. The blocks 926 and 927 represent the reading in of the measured invaded zone low frequency conductivity, such as from the device 41 (FIG. 1), and the comparison of the estimated low frequency conductivity with the measured low frequency conductivity. This comparison can be used directly as a quality indicator, or can be used to modify the selection of the conductivity dispersion ratio table utilized in the process.

The invention has been described with reference to particular embodiments, but variations within the spirit and scope of the invention will occur to those skilled in the art. For example, corrections can be implemented to take account of the presence of clays. Further, while specific types of logging tools have been described for the prupose of obtaining measurements of electrical parameters, it will be understood that other types of tools, operating at other frequencies, can be used, consistent with the principles of the invention. Finally, it will be understood that wherever reference is made to conductivity, an appropriate reference to resistivity is implied, and vice versa.

We claim:

1. A method for determining an estimated low frequency conductivity of a formation surrounding a borehole, comprising the steps of:
    deriving a measured value of formation high frequency conductivity from a logging device which traversed the borehole;
    determining a formation conductivity dispersion ratio as a function of the measured conductivity; and
    determining an estimated low frequency conductivity from said measured value of high frequency conductivity and said dispersion ratio.

2. The method as defined by claim 1, wherein said step of determining an estimated low frequency conductivity from said measured value of high frequency conductivity and said dispersion ratio comprises dividing said measured value by said dispersion ratio.

3. The method as defined by claim 1, further comprising the step of storing a predetermined conductivity dispersion ratio function for the formation, as a function of conductivity, and wherein said formation conductivity dispersion ratio is determined from said predetermined conductivity dispersion ratio function and said measured conductivity.

4. The method as defined by claim 2, further comprising the step of storing a predetermined conductivity dispersion ratio function for the formation, as a function of conductivity, and wherein said formation conductivity dispersion ratio is determined from said predetermined conductivity dispersion ratio function and said measured conductivity.

5. The method as defined by claim 1, wherein said predetermined conductivity dispersion ratio function for the formation is a function of frequency divided by conductivity.

6. The method as defined by claim 2, wherein said predetermined conductivity dispersion ratio function for the formation is a function of frequency divided by conductivity.

7. The method as defined by claim 3, wherein said predetermined conductivity dispersion ratio function for the formation is a function of frequency divided by conductivity.

8. The method as defined by claim 2, wherein said measured value of formation high frequency conductivity and the determined estimated low frequency conductivity are for the formation invaded zone.

9. The method as defined by claim 4, wherein said measured value of formation high frequency conductivity and the determined estimated low frequency conductivity are for the formation invaded zone.

10. The method as defined by claim 1, further comprising the steps of deriving a measured value of low frequency conductivity from a logging device which traversed the borehole; and comparing said measured value of low frequency conductivity to said determined estimated value of low frequency conductivity.

11. The method as defined by claim 9, further comprising the steps of deriving a measured value of low frequency conductivity from a logging device which traversed the borehole; and comparing said measured value of low frequency conductivity to said determined estimated value of low frequency conductivity.

* * * * *

UNITED STATES PATENT AND TRADEMARK OFFICE
CERTIFICATE OF CORRECTION

PATENT NO. : 4,780,679
DATED : October 25, 1988
INVENTOR(S) : William E. Kenyon, Paul L. Baker It is certified that error appears in the above-identified patent and that said Letters Patent is hereby corrected as shown below:

Col. 10, line 16 change "2" to --1--

Signed and Sealed this

Second Day of May, 1989

Attest:

DONALD J. QUIGG

*Attesting Officer*    *Commissioner of Patents and Trademarks*